July 30, 1940.    J. C. WHITESELL, JR    2,209,909
WELDED METAL STRUCTURE
Filed Aug. 7, 1937
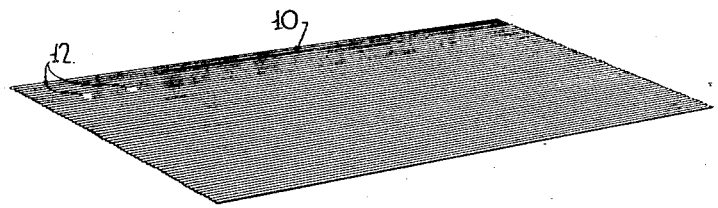
FIG.1
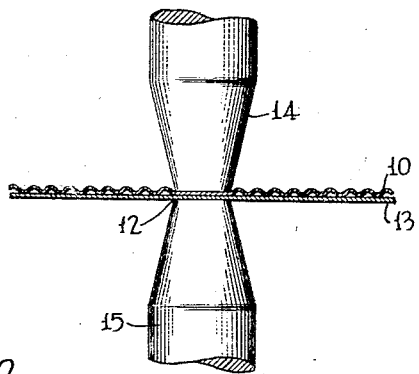
FIG.2
FIG.3
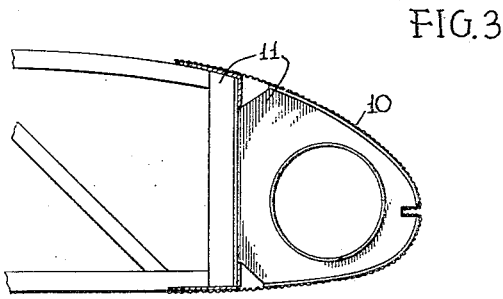
INVENTOR:
John C. Whitesell Jr.
BY John P. Tarbox
ATTORNEYS.

Patented July 30, 1940

2,209,909

UNITED STATES PATENT OFFICE 2,209,909

WELDED METAL STRUCTURE

John C. Whitesell, Jr., Norristown, Pa., assignor to Edward G. Budd Manufacturing Company, Philadelphia, Pa., a corporation of Pennsylvania Application August 7, 1937, Serial No. 157,832

1 Claim. (Cl. 189—36)

The present invention relates to structural sheet metal material and method of making and utilizing the same, and is a continuation in part of my co-pending application Serial No. 605,573, filed April 16, 1932, now Patent No. 2,089,242, granted August 10, 1937.

The principal object of the invention is the provision of a corrugated structural sheet metal material and method of making and utilizing the same whereby the same is workable, and may be used in the fabrication of a structure, in substantially the same manner as plain sheet, with improved advantages in strength relative to weight.

Another desirable characteristic of my invention is found, in that, it may be welded as by spot welding, giving a joint of appreciably greater tensile strength than is attainable from a joint between plain sheets.

My invention will be better understood from the following description when considered in connection with the accompanying drawing and its scope will be pointed out in the appended claim.

In the accompanying drawing wherein like ordinals represent corresponding parts in the various figures, Fig. 1 shows a sheet of material made in accordance with my invention.

Fig. 2 shows a magnified cross section illustrating a point of securement with a flat surface.

Fig. 3 shows an application of my new structural material to the nose of an airplane wing.

In accordance with my invention I take plain sheet material and by means of cold working, as by drawing or other suitable operations, corrugate the same in a manner so as to give to the corrugations a pitch approximately three times the thickness of the metal.

Pitch, as herein used, designates the distance between the same relative point upon two consecutive crests or undulations upon the same side of the medial plane of a sheet. If for example the sheet thickness was approximately 0.012 inch the pitch might be about 0.030 inch more or less. The effective thickness of a corrugated sheet as herein made would likewise be about 0.036 inch measuring between the planes coextensive with outside of the crests upon the opposite sides of the medial plane of the sheet. It is preferable that the internal radius of the corrugations should not be less than the metal thickness and obviously either a sine form or a form approaching a saw tooth shape may be used.

In drilling, cutting, welding or other working of a sheet of this sort the ease of operations is equivalent to the ease of performing the same operation upon a plane sheet of metal.

Shown in perspective in Fig. 1, is a sheet 10 corrugated in accordance with the teachings of my invention wherein may be seen at the left hand edge 11 (see Fig. 3) the relative proportions of the corrugations to the width of the sheet. At several points on the sheet are areas 12 showing spot welds made on material of this type. The cross section of this material, greatly magnified, is substantially as seen in Fig. 2, wherein I have shown welded, a corrugated member 10 to a flat surface 13 which may be any framework or supporting member. In the drawing the welding electrodes, 14 and 15 are of relatively large magnitude extending over a plurality of corrugations the area 12 therebetween being a welded joint between the two members 10 and 13. This inclusion of several corrugations by the electrode is assured by the low ratio of corrugation pitch to metal thickness, which ratio as above stated is about three to one.

The gauge of metal used in forming the present material ranges from .010 to .040 inch, in which range the diameter of electrode usually employed for spot welding flat sheets is approximately 12.5 to 9 times metal thickness, the ratio diminishing with increase in metal thickness as indicated in the following table used as a guide in actual shop practice in the spot welding of sheet stainless steel:

| Metal thickness, inches | Electrode diameter, inches | Electrode diameter divided by metal thickness |
|---|---|---|
| .010 | .125 (⅛) | 12.5 |
| .012 | .125 (⅛) | 10.41 |
| .016 | .1875 (³⁄₁₆) | 11.71 |
| .025 | .250 (¼) | 10 |
| .035 | .3125 (⁵⁄₁₆) | 9.21 |

From the above table it will be seen that even at the thicker gauges the electrode diameter is at least 9 times metal thickness and will therefore cover a plurality of corrugations of any pitch not greater than in the neighborhood of 6 times metal thickness.

Sheet material made in this manner has a greater tensile strength because of the cold working. The effective thickness of the sheet material is substantially three times the thickness of the metal itself whereas the increase in weight is only about one-third more than a plain sheet.

It is quite obvious that the desirable characteristics of this material will make it especially appropriate for use as the skin element in the fabrication of airplane parts. The increased stiffness and greater tensile strength, greater in proportion, than the relative increase in weight is especially valuable because of the inherent weight, horsepower criterion in such structures. Because of the fineness of corrugation in proportion to the thickness of metal, the forming of the corrugated contour of the sheet is preferably effected by a drawing of the metal through corrugating roller dies in a direction parallel to the corrugations, as distinguished from a bending of the metal as in the formation of the usual corrugated sheet metal where the corrugations are vastly larger in proportion to the metal thickness. This action on the metal is very beneficial to the resultant material, inasmuch as it increases the tensile strength. Preferably the corrugated sheet is formed from a strip of flat rolled sheet material by moving the strip in the direction of the length through forming dies extending transversely of the strip to simultaneously form all the corrugations throughout the width of the strip or at least several corrugations. The strip is thus held against substantial change in width and is deformed or caused to flow in the direction of its width.

With the above structure a new form of corrugated material is created with new characteristics and great improvement in quality over the known forms of corrugated sheet material. Outstanding among these new characteristics is that the material may be bent sharply about an axis at right angles to the corrugations and even sufficiently beyond its limit of elasticity to cause the metal to flow, without buckling the corrugations, thus preserving their sectional contour throughout the curvature of the bend. Another advantageous characteristic of the new material is its high resistance against expansion transverse to the corrugations for a given metal thickness, believed to be due in part to the fact that the leverage acting to straighten out the corrugations is extremely small relative to metal thickness, and in part to improvements in the quality of the metal resulting from the working of the metal into the new form. This characteristic renders the new material of great value as a wing covering for airplanes especially where the material is formed from high tensile stainless steel in which case its stiffness in proportion to weight is much greater than that of the aluminum sheathing heretofore used. It is not necessary to fasten the material at each corrugation to the framework to prevent expansion by flattening of the corrugations as is required in the use of heretofore known forms of corrugated sheet material. The new material may be spot welded at suitable and convenient intervals without regard to the corrugations the same as smooth sheet material. Because of the fineness of the corrugations relative to metal thickness, spot welding electrodes of a diameter well within even the smaller limits practical with smooth material, for example, not greater than twenty times metal thickness and as small as eight times metal thickness will weld plural corrugations.

The application of the invention to stainless steel is also of considerable importance. In addition to its resistance to corrosion which is one of the desirable characteristics of duralumin, stainless steel will give greater strength for the same unit weight while at the same time being a material more suitable for welding, and less subject to failure from fatigue strains.

When applying the structural sheet material of my invention to the nose or leading tip of an airplane wing structure as illustrated in Fig. 3, where 11 designates the framework and 10 the skin, although the corrugations are transverse to the direction of motion of the airplane and would naturally be expected to increase the air drag, the small depth giving the desirable increase in stiffness does not add to the drag.

The embodiment of my invention herein illustrated and described has been illustrated for the purpose of clearly setting forth the principles involved, but it will be apparent that the invention is susceptible of being modified to meet the different conditions encountered in its use and I therefore aim to cover all modifications within the true spirit and scope of this invention by the appended claim.

What I claim is:

A welded metal structure comprising a framework and a corrugated sheet metal element of relatively light gauge, having lineal corrugations of a pitch substantially three times metal thickness and a depth substantially three times metal thickness, said corrugated sheet metal element being spot welded to the frame work through a plurality of single spot welds spaced apart with several unwelded corrugations therebetween, each spot weld extending over an area including a plurality of corrugations, the corrugations being collapsed and flattened at each spot weld.

JOHN C. WHITESELL, Jr.